(12) United States Patent
Schieren et al.

(10) Patent No.: US 12,311,299 B2
(45) Date of Patent: May 27, 2025

(54) MIST ELIMINATOR PROFILE AND ASSOCIATED METHOD OF PRODUCTION

(71) Applicant: Munters Euroform GmbH, Aachen (DE)

(72) Inventors: Wilhelm Schieren, Aachen (DE); Jürgen Schmitz, Aachen (DE)

(73) Assignee: MUNTERS EUROFORM GMBH, Aachen (DE)

( * ) Notice: Subject to any disclaimer, the term of this patent is extended or adjusted under 35 U.S.C. 154(b) by 0 days.

(21) Appl. No.: 17/636,605

(22) PCT Filed: Jul. 24, 2020

(86) PCT No.: PCT/DE2020/000167
§ 371 (c)(1),
(2) Date: Apr. 12, 2022

(87) PCT Pub. No.: WO2021/032231
PCT Pub. Date: Feb. 25, 2021

(65) Prior Publication Data
US 2022/0297038 A1      Sep. 22, 2022

(30) Foreign Application Priority Data
Aug. 21, 2019   (DE) .................... 10 2019 005 893.3

(51) Int. Cl.
*B01D 45/14* (2006.01)

(52) U.S. Cl.
CPC ................. *B01D 45/14* (2013.01)

(58) Field of Classification Search
CPC .......... B01D 45/14; B01D 45/08; B21D 5/08; B21D 17/04
See application file for complete search history.

(56) References Cited

U.S. PATENT DOCUMENTS

| 947,393 | A | * | 1/1910 | Muchka | ................. | B01D 45/08 |
| | | | | | | 55/440 |
| 3,338,035 | A | * | 8/1967 | Dinkelacker | .......... | B01D 45/08 |
| | | | | | | 55/440 |

(Continued)

FOREIGN PATENT DOCUMENTS

| CN | 205886411 U | 1/2017 |
| DE | 102007045644 A1 | 4/2009 |

(Continued)

OTHER PUBLICATIONS

PCT/DE2020/000167; International Search Report and Written Opinion dated Nov. 25, 2020 (9 pages).

(Continued)

*Primary Examiner* — Dung H Bui
(74) *Attorney, Agent, or Firm* — Barclay Damon LLP

(57) ABSTRACT

A mist eliminator profile includes a plurality of vane profiles arranged in parallel with one another and at a distance from one another and at least one separation zone. The separation zone includes a plurality of embossed portions and is configured for removing liquid droplets from a gas flowing along the vane profile. The plurality of embossed portions are produced by a roll forming procedure and the direction of the vane profile changes direction after at least one of the embossed portions. The plurality of embossed portions include a rounded shape so that all directional changes of the vane profile are formed by one of the plurality of embossed portions.

7 Claims, 2 Drawing Sheets

(56) References Cited

U.S. PATENT DOCUMENTS

| | | | | | |
|---|---|---|---|---|---|
| 3,751,886 | A | * | 8/1973 | Sokolowski | B01D 45/08 55/440 |
| 3,870,488 | A | * | 3/1975 | Arndt | B01D 45/08 55/440 |
| 3,925,040 | A | * | 12/1975 | Fattinger | B01D 45/16 55/440 |
| 4,053,292 | A | * | 10/1977 | Schneider | B01D 50/00 55/440 |
| 4,072,478 | A | * | 2/1978 | Regehr | B01D 45/16 55/440 |
| 4,141,706 | A | * | 2/1979 | Regehr | B01D 45/16 55/440 |
| 4,175,938 | A | * | 11/1979 | Regehr | B01D 45/16 55/440 |
| 4,225,188 | A | * | 9/1980 | McGuire | E21C 35/223 55/440 |
| 4,557,740 | A | * | 12/1985 | Smith | B01D 45/06 55/440 |
| 4,581,051 | A | * | 4/1986 | Regehr | B01D 45/08 55/440 |
| 5,268,011 | A | * | 12/1993 | Wurz | B01D 45/08 55/440 |
| 7,954,542 | B2 | * | 6/2011 | Janssens | B01D 5/009 165/113 |
| 2004/0177598 | A1 | * | 9/2004 | Bohacik | F24C 15/2035 55/423 |
| 2004/0216502 | A1 | * | 11/2004 | Chung | B21D 5/08 72/179 |
| 2016/0101489 | A1 | * | 4/2016 | Buitenhuis | B21D 5/08 277/345 |
| 2016/0175750 | A1 | * | 6/2016 | Padovan | F22B 37/26 55/440 |
| 2016/0288187 | A1 | * | 10/2016 | Nishijima | F16L 17/04 |
| 2017/0203350 | A1 | * | 7/2017 | Okada | B21D 7/08 |
| 2017/0259320 | A1 | * | 9/2017 | Nakao | B21D 25/00 |
| 2017/0266713 | A1 | * | 9/2017 | González Fanfalone | B21D 25/00 |
| 2019/0169849 | A1 | * | 6/2019 | Jordan | B21B 1/38 |
| 2020/0101507 | A1 | * | 4/2020 | Smedberg | B21B 3/00 |
| 2022/0297038 | A1 | * | 9/2022 | Schieren | B01D 45/14 |

FOREIGN PATENT DOCUMENTS

| | | |
|---|---|---|
| DE | 202008016546 U1 | 5/2009 |
| DE | 102010017253 A1 | 12/2010 |
| WO | 2008104207 A1 | 4/2008 |

OTHER PUBLICATIONS

PCT/DE2020/000167; English Translation of International Search Report dated Nov. 25, 2020 (2 pages).

CN 202080064573.4: Filed Jul. 24, 2020; Notification of Second Office Action; Date of Notification Oct. 17, 2023 (6 pages).

CN 202080064573.4: Filed Jul. 24, 2020; English translation of Notification of Second Office Action; Date of Notification Oct. 17, 2023 (7 pages).

* cited by examiner

MIST ELIMINATOR PROFILE AND ASSOCIATED METHOD OF PRODUCTION

CROSS REFERENCE TO RELATED INVENTION

This application is a national stage application pursuant to 35 U.S.C. § 371 of International Application No. PCT/DE2020/000167, filed on Jul. 24, 2020, which claims priority to, and benefit of, German Patent Application No. 10 2019 005 893.3, filed Aug. 21, 2019, the entire contents of which are hereby incorporated by reference.

TECHNOLOGICAL FIELD

The following disclosure is directed to a mist eliminator profile configured as a vane profile for forming mist eliminator units comprising a large number of vane profiles arranged in parallel with one another and at a distance from one another. The mist eliminator profile comprises at least one separation zone for removing liquid droplets from a gas flowing along the vane profile.

BACKGROUND

Mist eliminators of this kind are known. They comprise corresponding separation zones that are formed of a large number of structures. These include, for example, projections, collection pockets, channels, deflectors, phase-separation chambers, etc. Structures of this kind are produced, for example, by bending, kinking, pressing, or welding the corresponding metal sheets. To do this, a large number of individual work steps are generally required, which makes production of mist eliminator profiles of this kind both time-consuming and cost-intensive.

BRIEF SUMMARY OF THE INVENTION

The object of the present invention is to provide a mist eliminator profile of the type described at the outset which is easy and economical to produce. This object is achieved according to the invention in a mist eliminator profile of the above-mentioned type in that the separation zone has at least one embossed portion produced by roll forming.

The disclosed solution relates to two aspects. Firstly, it diverges from the known production methods for separation zone structures of this kind and, instead, proposes roll forming as the production method. Secondly, the invention replaces known structures, in particular projections and collection pockets, with simple embossed portions that are produced by means of roll forming. It has been shown that embossed portions of this kind can be produced in a fast and simple manner and also meet the requirements with regard to effective phase separation, such that a mist eliminator profile of this kind designed as a vane profile can overall be produced in a particularly simple, fast, and thus economical manner.

During roll forming (also cold rolling of profiles), an originally planar sheet metal strip, for example, is led through multiple driven pairs of rollers arranged one behind the other until said strip has been bent into the desired profile shape. In this way, it is possible to produce any desired profile shapes, wherein a separate set of rollers is required for each profile cross-section.

The embossed portion produced by means of roll forming is preferably a round embossed portion. Round to oval embossed portions of this kind are particularly easy to produce from flat pieces of sheet metal and also have the advantage that they are less susceptible to soiling than, for example, deflectors, which have sharp edges. Preferably, a roll-formed portion (round embossed portion) of this kind is partially circular or semi-oval in cross-section.

According to an embodiment, a separation zone of this kind may comprise one embossed portion or multiple embossed portions. In particular, multiple embossed portions that are arranged one behind the other and that may extend in the same or in different directions are used. For example, the vane profile may comprise embossed portions in different directions in an alternating manner.

According to a preferred embodiment, the vane profile includes embossed portions in the manner of a wave, in particular a sine wave. Wave-like regions of this kind may be as long as desired in order to achieve the desired phase separation or flow separation.

The vane profile may also change direction after an embossed portion. For example, instead of a sharp edge produced in the conventional manner, an embossed portion, in particular a round embossed portion, may be provided, where the legs of said embossed portion form an angle other than 180° with one another.

Overall, a solution in which the mist eliminator profile has no sharp bending edges whatsoever is preferred, with said edges being replaced with corresponding round embossed portions, such that all changes in direction of the vane profile are formed by round embossed portions. Said round embossed portions have the advantage that the risk of contamination of vane profiles of this kind is lower than in the prior art and that cleaning is made easier.

The present disclosure further relates to a method for producing a mist eliminator profile of the above-described type that has at least one separation zone and is configured as a vane profile. A embodiment of a method for producing a mist eliminator profile includes providing a sheet metal strip and subjecting the sheet metal strip to at least one roll forming procedure to form in the sheet metal strip at least one embossed portion that serves as a separation zone.

According to an embodiment, structures of the mist eliminator profile that serve as a separation zone are therefore produced by means of roll forming (bending and embossing), where at least one embossed portion is thereby formed in the sheet metal strip in the region of the separation zone. In particular, all shaping steps for the sheet metal strip that are required to produce a vane profile serving as a mist eliminator profile are predominantly performed by means of roll forming steps, wherein, in particular, multiple roll forming procedures are carried out one after another in order to produce the at least one embossed portion and, if applicable, other shaped portions.

The at least one embossed portion is preferably configured as a round embossed portion or oval embossed portion, which brings the advantages explained above. More preferably, multiple embossed portions are produced by means of roll forming, in particular in different directions, and thus form corresponding separation zones.

In an embodiment of the disclosed method, the embossed portion is produced by means of roll forming (bending and embossing) in a planar sheet metal strip, after which the sheet metal strip provided with the embossed portion is bent multiple times, if required, in order to produce the vane profile. The corresponding bending procedures can also be carried out by means of profiling. In particular, the invention provides for a vane profile of this kind to be produced on a single roll forming machine through which the corresponding sheet metal strip passes in order to carry out the corresponding shaping procedures, which preferably consist of embossment procedures.

After the at least one roll forming procedure has been carried out or after multiple profiling procedures have been carried out, the sheet metal strip can be severed to produce individual vane profiles.

It should be understood that all features of the mist eliminator profiles described at the outset can be realized with the method according to the invention.

BRIEF DESCRIPTION OF THE DRAWINGS

The invention is described in detail hereinafter with reference to exemplary embodiments in conjunction with the drawing, in which.

DETAILED DESCRIPTION OF THE INVENTION

Figure 1:
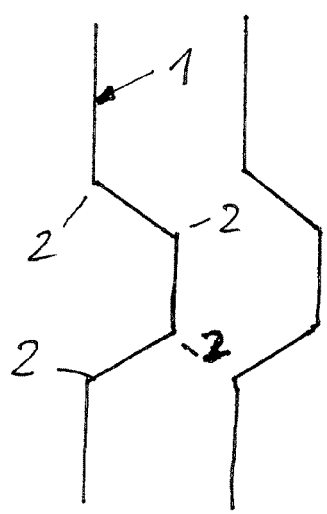
FIG. 1 illustrates a cross-sectional view of two embodiments of vane profiles of a mist eliminator unit.

FIG. 1 shows two vane profiles 1 arranged in parallel with one another for a mist eliminator unit of the prior art in vertical cross-section. The vane profiles form flow paths between them, through which a gas flows in order to remove liquid droplets carried in the gas. The removal process in this case takes place at deflection points that form corresponding separation zones and that are formed by edges 2 that are produced by bending planar sheet metal profiles.

Figure 2:
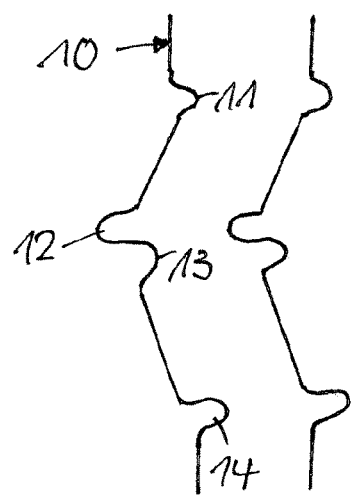
FIG. 2 illustrates a cross-sectional view of two more embodiments of vane profiles of a mist eliminator unit.

FIG. 2 shows two vane profiles 10 configured according to the invention in vertical cross-section. In this case, the corresponding deflection points are not formed of sharp edges, but rather of round embossed portions 11, 12, 13, 14 that are produced by means of roll forming. Said round embossed portions extend in different directions, wherein the two round embossed portions 12, 13 are arranged next to one another and cause the profile to change direction. This is also the case for the round embossed portions 11, 14. In this case, too, the corresponding legs form an angle other than 180° with one another.

In this embodiment, it is clear to see that all direction changes of the profile are caused by round embossed portions, wherein said round embossed portions are effective with regard to the desired phase separation and can be produced in a particularly simple and quick manner by means of a corresponding roll forming machine, for example.

Figure 3:
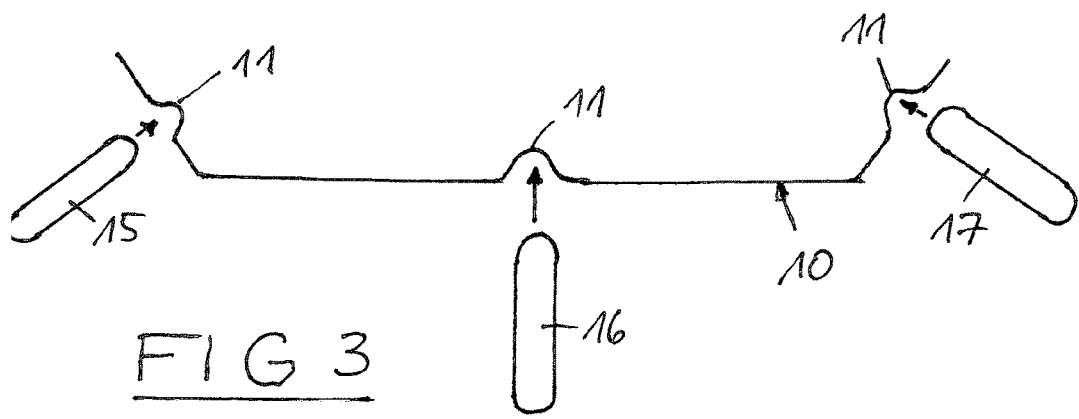
FIG. 3 is a schematic representation of an embodiment of production of a vane profile.

FIG. 3 schematically shows the production of a vane profile 10 provided with round embossed portions 11. The round embossed portion 11 shown in the center is produced by means of a roller 16 that is provided with a corresponding profile and that, for example, forms an angle of 90° with the metal strip. The two lateral rollers 15, 17 are arranged obliquely with respect to the plane of the metal strip and produce corresponding round embossed portions while also angling the strip.

Figure 4:
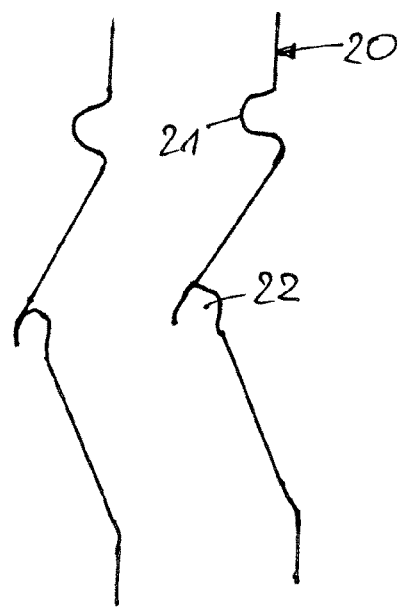
FIG. 4 illustrates a cross-sectional view of two more embodiments of vane profiles of a mist eliminator unit.

FIG. 4 shows another embodiment of vane profiles 20 in cross-section. The respective profiles have two round embossed portions 21, 22, wherein the round embossed portion 22 is arranged in the shape of a pocket, whereas the round embossed portion 21 is approximately semi-circular in cross-section and causes the profile to change direction.

Figure 5:
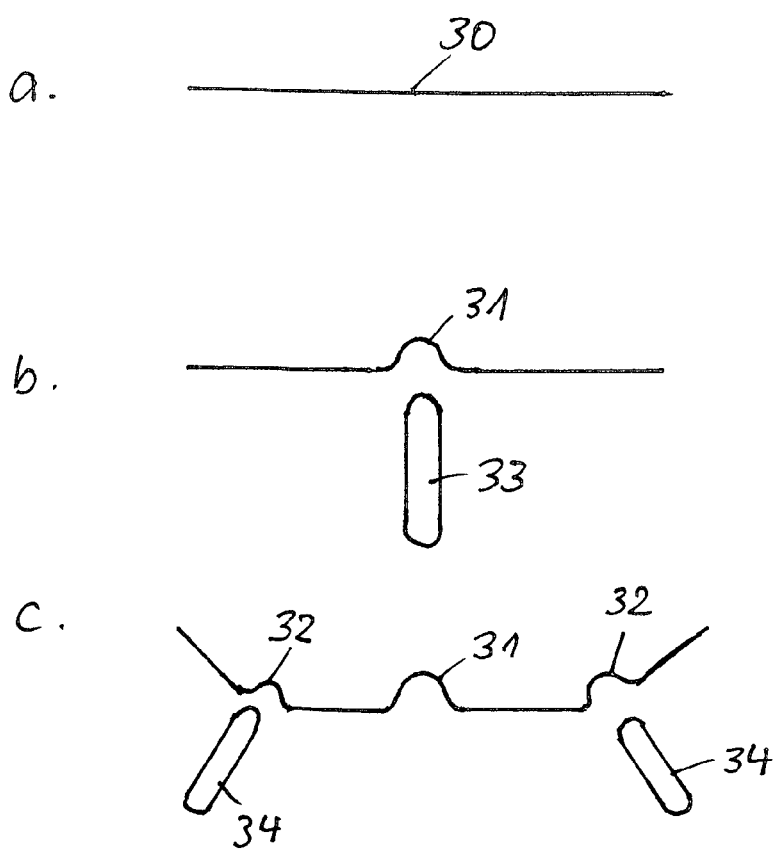
FIG. 5a schematically illustrates an embodiment of a first stage of production of an embodiment of a vane profile.
FIG. 5b schematically illustrates an embodiment of a second stage of production of the embodiment of the vane profile.
FIG. 5c schematically illustrates an embodiment of a third stage of production of the embodiment of the vane profile.

FIGS. 5a-c schematically shows three stages for producing a vane profile. FIG. 5a shows a planar metal strip 30 in cross-section. FIG. 5b shows how a round embossed portion 31 is created in the planar metal strip by means of a roller 33 of a corresponding roll forming machine. In another step, shown in FIG. 5c, two other round embossed portions 32 with angled metal strip regions are created by means of two inclined rollers 34.

It should be understood that the procedure represented schematically in FIGS. 5a-c is merely an exemplary embodiment for the production of a vane profile. What is essential is that a vane profile is produced which has at least one separation zone comprising at least one embossed portion produced by means of roll forming for removing liquid droplets from a gas flow.

The invention claimed is:

1. A mist eliminator profile comprising:
a plurality of vane profiles arranged in parallel with one another and at a distance from one another, wherein each of the plurality of vane profiles is formed from an originally planar sheet metal strip, wherein at least one of the plurality of vane profiles comprises,
at least two separation zones configured for removing liquid droplets from a gas flowing along the at least one vane profile; and
a planar portion positioned between the at least two separation zones,
wherein at least one of the at least two separation zones comprises two embossed portions positioned adjacent to each other,
wherein the at least two separation zones are produced by a roll forming procedure,
wherein one of the two embossed portions extends in a first direction and
wherein another of the two embossed portions extends in a second direction that is different than the first direction,
wherein a direction of the vane profile changes direction at each of the at least two separation zones,
wherein each the at least one embossed portion comprises a rounded shape.

2. The mist eliminator profile according to claim 1, wherein the rounded shape comprises a partially circular cross-sections.

3. The mist eliminator profile according to claim 1, wherein some of the plurality of embossed portions are positioned one behind the other.

4. The mist eliminator profile according to claim 1, wherein the plurality of embossed portions comprise multiple embossed portions that extend in different directions relative to each other.

5. The mist eliminator profile according to claim 4, wherein the the different directions comprise opposing directions in an alternating manner.

6. The mist eliminator profile according to claim 5, wherein the plurality of embossed portions are positioned to create a sine wave configuration.

7. The mist eliminator profile according to claim 1, wherein each of the plurality of embossed portions comprises a single peak that extends from a plane of the vane of the profile.

\* \* \* \* \*